Figure 1:
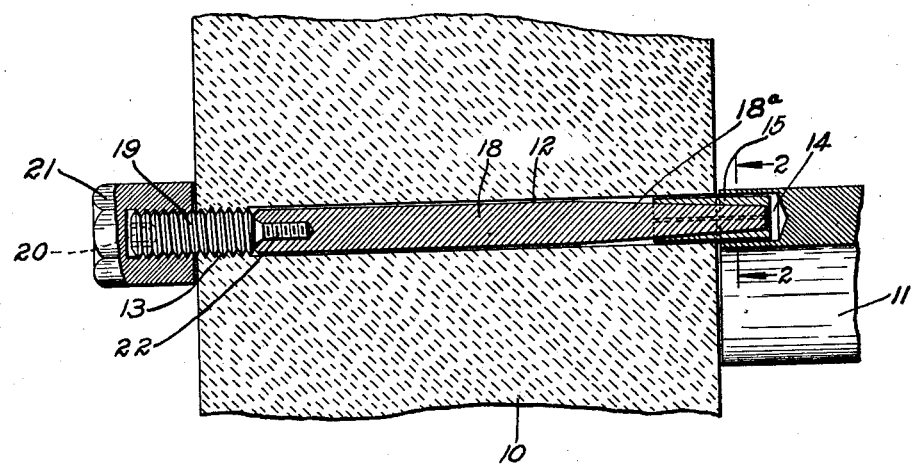

May 22, 1934.  C. C. BEAL  1,960,046
FASTENING DEVICE
Filed April 30, 1931

Charles C. Beal
INVENTOR

BY R. J. Dearborn
ATTORNEY

Patented May 22, 1934

1,960,046

UNITED STATES PATENT OFFICE 1,960,046

FASTENING DEVICE

Charles C. Beal, Port Arthur, Tex., assignor to The Texas Company, New York, N. Y., a corporation of Delaware Application April 30, 1931, Serial No. 533,917

3 Claims. (Cl. 85—2.4)

My invention relates to fastening devices for holding one member securely in position against another member, and more particularly to an expanding bushing device for securing a member such as a cylinder liner of a pump or a compressor firmly against a cylinder head. The principal object of my invention is the provision of a device of this kind which may be installed easily, which will not work loose due to vibration, and which will be strong enough for heavy duty while requiring a minimum of space.

It is frequently necessary that two members, such as a cylinder head and a cylinder liner should be maintained firmly in position with respect to each other and this is especially true in gas compressors where, due to the presence of corrosive substances such as hydrogen sulphide in the gases, it is necessary to use a liner for the main cylinder, this liner being made of a material which will not be acted upon by the gases. The cylinder liner usually has a friction fit in the main cylinder and since the inlet and exhaust ports must pass through both the cylinder and the liner, it is essential that the liner be maintained in perfect alignment with the cylinder. It is obvious that if the liner should turn with respect to the main cylinder, due, perhaps to vibration, the ports would not align and an explosion of gases might result with serious consequences.

My invention is not limited to use only with cylinder liners since there are many other instances where it is desirable or necessary to hold two objects in a definite or predetermined position. In such instances it is common to pass threaded bolts or screws through one of the objects and screw them into the other object. There are several disadvantages in this practice, one of these being the loosening of the bolts due to the jarring or vibration of the parts, this being particularly true in connection with reciprocating pumps and compressors. When connections are made with the use of ordinary bolts, these bolts often work loose or break due to unequal expansion when heated, thus permitting the various parts to get out of alignment whereupon serious damage may result. Moreover, the threads on the bolts are continually becoming worn or broken, thus entailing an expense for rethreading or replacing the bolts or the parts which the bolts serve to connect.

In carrying out my invention I have provided a fastening device comprising a semi-flexible expanding bushing adapted to be placed partly in one member such as the cylinder head and partly in the other member such as the cylinder liner, and a tapered member adapted to be pushed into the expanding bushing to expand and force the latter into tight engagement with the two connected members. Means are also provided for removing the tapered member and for sealing the opening in the cylinder head when the tapered member is in its normal position.

Figure 2:
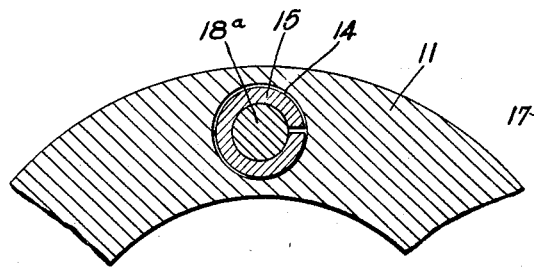
Figure 3:
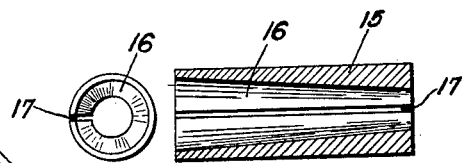

For a better understanding of my invention, reference may be had to the accompanying drawing wherein Figure 1 is a sectional elevation through a cylinder head and a cylinder liner showing the expanding bushing in place; Figure 2 is a sectional view taken on line 2—2 of Figure 1, while Figure 3 is an end view and longitudinal section of the bushing member.

Referring to Figure 1 of the drawing I have illustrated my invention as applied to a compressor having a cylinder head 10 and a liner 11, the outer or main cylinder being omitted for the sake of clearness. The cylinder head 10 is provided with an opening 12 extending therethrough, one end of this opening being threaded as shown at 13. The cylinder liner 11 is provided with one or more apertures 14, each aperture 14 being arranged so as to be in alignment with one of the openings 12 when the cylinder liner is in normal operative position with respect to the cylinder head 10. A bushing 15 of slightly smaller diameter than the openings 12 and 14 is adapted to be placed in these openings as shown in Figure 1, substantially half of the bushing being in the cylinder head 10 and half being in the liner 11. The bushing 15 is provided with a longitudinal tapered hole 16 and is split along one side as shown at 17. It will thus be seen that the bushing 15 is capable of being expanded and when in its expanded position will hold the liner 11 firm with respect to the cylinder head 10. In order to expand the bushing 15 after it has been placed in position in the openings 12 and 14, I have provided a pin 18 having a tapered portion 18a adapted to fit within the tapered hole 16 of the bushing 15. A set screw 19 cooperates with the threaded end of the opening 12 and is provided with an aperture 20 in which a suitable tool such as a small socket wrench may be inserted to turn the screw. A blind nut 21 having a gasket (not shown) may be threaded on the projecting end of the set screw 19 to seal the opening 12.

When the bushing 15, pin 18 and set screw 19 are in position as shown in Figure 1 the set screw 19 upon being turned will contact with the pin 18 and force the tapered portion 18a of the pin into the split bushing 15, thus expanding the bushing into firm engagement with the cylinder head 10 and the liner 11. The blind nut 21 may then be screwed on the projecting end of the set screw 19 and all of the parts will remain in the holding position.

If it should be desired to remove the bushing 15 it is merely necessary to remove the nut 21, unscrew the set screw 19 and then by screwing a small bolt or other tool into an opening 22 in the end of the pin 18 the pin can be readily withdrawn from the bushing 15 and the bushing then easily removed from the openings 12 and 14.

Obviously many modifications and variations of the invention, as hereinbefore set forth, may be made without departing from the spirit and scope thereof, and therefore only such limitations should be imposed as are indicated in the appended claims.

I claim:

1. In a device for fastening two members together, said members being provided with aligned apertures, a cylindrical bushing having a longitudinally tapered hole and adapted to be inserted partly in each of said apertures, and means for expanding said bushing in said apertures comprising a pin having a tapered portion adapted to fit within the tapered hole in said bushing, and an element adapted to be threaded into the aperture in one of said members for forcing said pin into said bushing.

2. A device for maintaining a cylinder liner in position against a cylinder head, said liner and said head being provided with aligned openings, comprising a split bushing adapted to be inserted in said openings, a pin having a tapered portion adapted to be forced into said bushing to expand said bushing in said openings whereby said liner will be held in rigid engagement with said cylinder head, said pin being normally enclosed in the opening in said cylinder head, and means provided for engagement of a tool for withdrawing said pin from said bushing.

3. A device for maintaining a cylinder liner in position against a cylinder head, said liner and said head being provided with aligned openings, comprising a hollow split bushing adapted to be inserted in said openings, a pin having a tapered portion for engagement with said bushing, said pin being located within the opening in said cylinder head, and a set screw threaded in said last mentioned opening and adapted to cooperate with said pin for forcing said pin into said bushing to expand said bushing into firm engagement with said members.

C. C. BEAL.